United States Patent [19]

Kirkman

[11] Patent Number: 5,024,009
[45] Date of Patent: Jun. 18, 1991

[54] APPARATUS AND METHOD FOR COLLECTING SHELLFISH AND THE LIKE

[76] Inventor: Kenneth G. Kirkman, 217 Heintzleman, Anchorage, Ak. 99503

[21] Appl. No.: 446,139

[22] Filed: Dec. 5, 1989

[51] Int. Cl.$^5$ .......................... E02F 5/00; A01K 75/00
[52] U.S. Cl. ........................................ 37/55; 37/119; 37/135; 56/8
[58] Field of Search .................. 37/55, 119, 115, 135; 56/8

[56] References Cited

U.S. PATENT DOCUMENTS

| | | | |
|---|---|---|---|
| 74,857 | 2/1868 | Sink | 37/55 |
| 1,413,944 | 4/1922 | Sockwell | 37/119 |
| 1,480,192 | 1/1924 | Worsfold | 37/55 X |
| 2,002,599 | 5/1935 | Bennett | 37/55 |
| 2,672,700 | 3/1954 | Hanks, Jr. | 37/55 |
| 2,684,549 | 7/1954 | Olden | 37/119 |
| 3,087,293 | 4/1963 | Cassidy | 56/8 |
| 3,113,389 | 12/1963 | Vuskovich | 37/119 |
| 3,367,048 | 2/1968 | Doughty | 37/55 |
| 3,608,217 | 9/1971 | Voisin, Sr. | 37/55 |
| 4,028,821 | 6/1977 | Hanks | 37/55 |
| 4,216,595 | 8/1980 | Kato et al. | 37/55 X |
| 4,425,723 | 1/1984 | Erlandsen | 37/55 |
| 4,446,637 | 5/1984 | Ferreira | 37/55 |
| 4,646,448 | 3/1987 | Voisin | 37/55 |

*Primary Examiner*—Dennis L. Taylor
*Assistant Examiner*—Franco S. De Liguori
*Attorney, Agent, or Firm*—Michael J. Tavella

[57] ABSTRACT

A new scallop net is disclosed that uses a lightweight frame that is fitted with a dive plate that produces a downward force on the frame and ensures that the frame remains on the bottom. Instead of a heavy metal basket, the device includes a standard skein netting made of nylon of similar material. The net has a splitting strap in the middle of the bag and is fitted with a cod end and a cod end release, which opens the bag when the strap or release is pulled.

Because the bag is fitted with a cod end, the steel frame does not have to be pulled onto the boat. The dangerous frame can be raised on a boom and left overhanging the boat. The splitting strap can then be used to pull the light net bag aboard, the cod end release can be pulled and the catch released. Once emptied, the cod end can be re-secured, the release mechanism can be reset, and the net thrown overboard. The frame end can then be released back into the sea for another run. Two bags can be dragged in this manner for optimum collection. Alternatively, a single bag can be supported from an A-frame support member suspended from the stern of the vessel.

The frame also has a number of tines that make a rake. The tines are set in holes drilled into the frame. The frame has a number of pre-drilled holes so that the tines can be removed and adjusted to the proper spacing for the desired type of shellfish, i.e., scallops, oysters or clams.

The method of using the new design is also disclosed, the method teaches the use of the cod end release as a means to safely harvest shellfish, while reducing fuel consumption and reducing the number of shellfish killed.

13 Claims, 5 Drawing Sheets

APPARATUS AND METHOD FOR COLLECTING SHELLFISH AND THE LIKE

This invention is related to apparatus for collecting shellfish such as scallops and oysters and particularly to shellfish collecting nets using lightweight netting and a cod end and the method of use for such devices.

BACKGROUND OF THE INVENTION

Scallops and other shellfish live on all bottom of waters of 20-90 fathoms deep. Traditionally, fishermen have used large, heavy collection bags to drag the bottom and collect the scallops. Examples of such devices are found in U.S. Pat. Nos. 2,684,549 (commonly known as "the New Bedford drag"), 3,113,389, 3,084,309, 3,608,217, and 4,646,448. Typically, these drags consists of a frame and some type of steel bag or basket that is attached to the frame. These drags are heavy to ensure that they remain on the bottom to obtain the largest catch. Because the devices are heavy, they require large boats to drag the devices on the bottom, and a considerable amount of fuel to operate the boats. An improved design, which reduces the fuel consumption on boats, is shown in U.S.Pat. Nos. 4,112,602, (apparatus) and 4,216,595 (method). This device uses a lightweight net material attached to a heavy frame to reduce the weight of the drag. Also, the method patent teaches a parallel method of dragging using winches, while the boat remains stationary. This method also conserves fuel. Although an improvement, the device suffers from a common fault that every device discussed above has.

From the earliest drags to the most modern, the method of emptying the bag remains the same, i.e., the entire drag must be brought aboard and the rear end of the bag is lifted allowing the catch to spill out of the open mouth of the drag. There are two inherent problems with this method of collection and they are inherent in every design discussed above. First, the operation is dangerous because the drags often weigh thousands of pounds. For example, the instant invention weighs approximately 650 pounds. An eight foot "New Bedford" type drag weighs approximately 1,200 pounds and a 16 foot "New Bedford" drag weighs between 3,500 and 5,000 pounds.

Workers handling the drags are often injured when they are struck by the heavy nets and frames. U.S. Pat. No. 3,608,217 attempts to mitigate this danger by producing an unloading jig that holds the catching basket and dumps it, lessening the danger, but not solving the second problem.

The second problem with the steel drags is that by dragging the heavy bags across the sea bed, often at 6-7 knots, hundreds of scallops not picked up in the net are killed. The National Fisherman, for example, cited the Research Department of the Woods Hole Oceanographic Institute, of Woods Hole, Mass., which reported that the so-called "New Bedford" drag kills one pound of shellfish for every pound caught. This problem is not limited to the "New Bedford" drag, as all open mouth steels drags discussed above operate in the same manner.

In addition to safety and kill problems, the steel bag drags require a considerable amount of fuel to use. For instance, some representative examples using the "New Bedford" drag are provided.

Boat 1: 105' in lenght, 23' wide, pulling two 16' New Bedford drags, will burn approximately 30,000 gallons of fuel in one month or 1,000 gallons per day, operating at 6-7 knots.

Boat 2: 80' long, 18' wide, pulling two 9 foot New Bedford drags, will use 400 gallons or more, depending on the weather. Average speed 6-7 knots.

Boat 3: 70' long 16-18' wide, pulling two 8' New Bedford drags will use 300-375 gallons per day, dependig on the weather. Average speed 6-7 knots.

In contrast, using the instant invention, one needs a smaller boat and can operate at much slower speeds. For example, a 58' long, 18' wide boat, pulling one 12 foot bag will use 70 gallons per day at an average speed of 3.5 knots.

It is estimated that if 2 drags were used, fuel consumption would be between 70 and 120 gallons per day at an average speed of 3.5 knots.

SUMMARY OF THE INVENTION

The present invention overcomes all of the problems discussed above. It comprises of a lightweight frame that is fitted with a dive plate that produces a downward force on the frame and ensures that the frame remains on the bottom. Instead of a heavy metal basket, the device includes a standard skein netting made of nylon of similar material. The net has a splitting strap in the middle of the bag and is fitted with a cod end. A cod end is an arrangement that seals the end of the bag with a releasable strap, or cod end release, that opens the bag when the strap or release is pulled.

Because the bag is fitted with a cod end, the steel frame does not have to be pulled onto the boat. The lightweight (but still dangerous) frame can be held off a boom that overhangs the boat. The splitting strap can then be used to pull the light net bag aboard, the cod end release can be pulled and the catch released. The use of the cod end allows the bag to remain close to the deck, preventing damage to the catch and to the fisherman as it is being unloaded. Once emptied, the cod end can be re-secured, the release mechanism can be reset, and the net thrown overboard. The frame end can them be released back into the sea for another run. Two bags can be dragged in this manner for optimum collection.

The frame also has a number of tines that make a rake. The tines are set in holes drilled into the frame. The frame has a number of pre-drilled holes so that the tines can be removed and adjusted to the proper spacing for the desired type of shellfish, i.e., scallops, oyesters or claims.

It is an object of this invention to design a lightweight scallop drag that eliminates the need to bring the entire drag aboard shop to be emptied.

It is another object of this invention to produce a drag fitted with a cod end so that it can be emptied from the rear of the bag.

It is a further object of the invention to produce a lightweight apparatus that can be used by smaller boats and that will use less fuel to operate safely.

DETAILED DESCRIPTION OF THE PREFERRED EMBODIMENT

Figure 1:
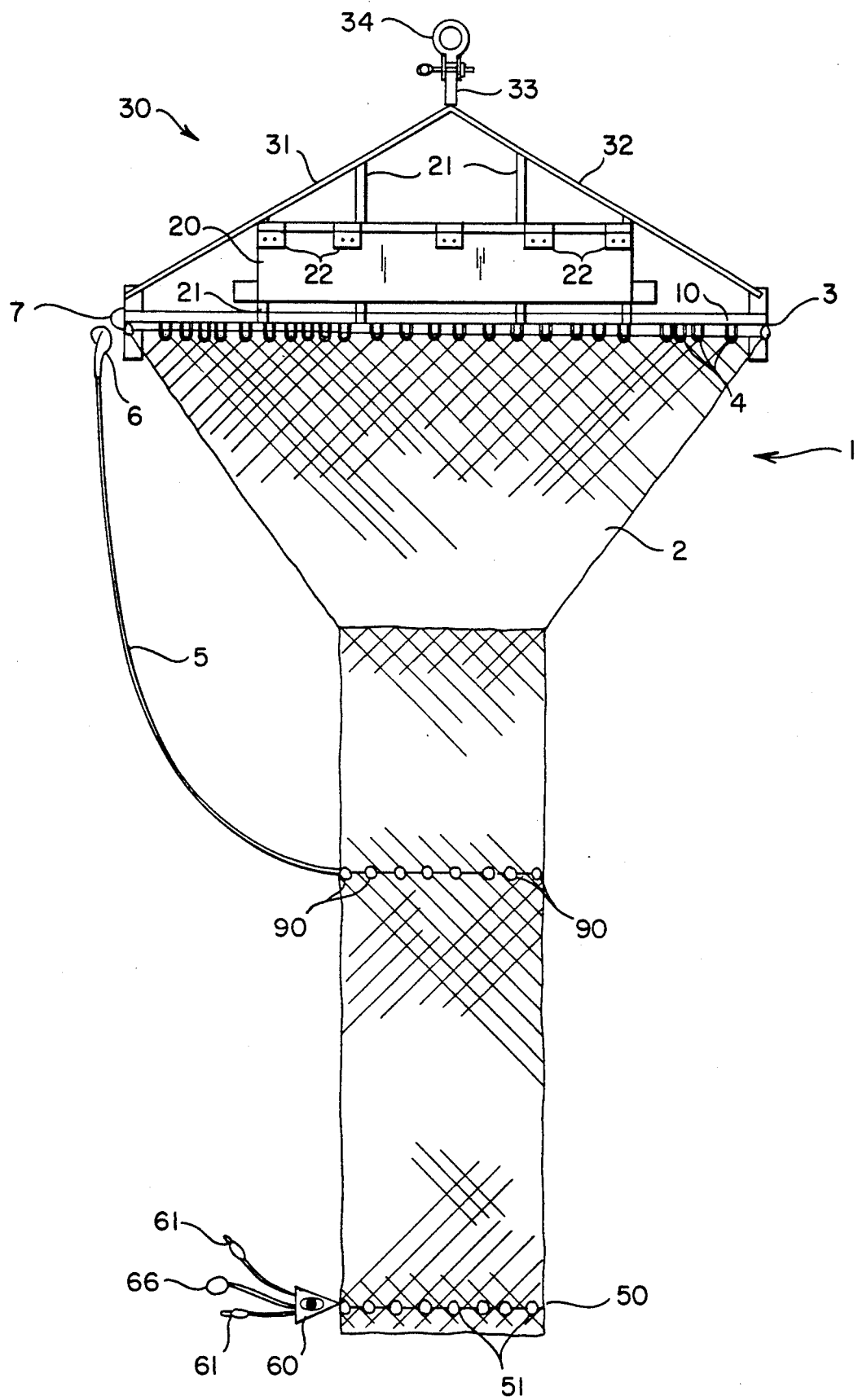
FIG. 1 is a top view of the invention.
Figure 2:
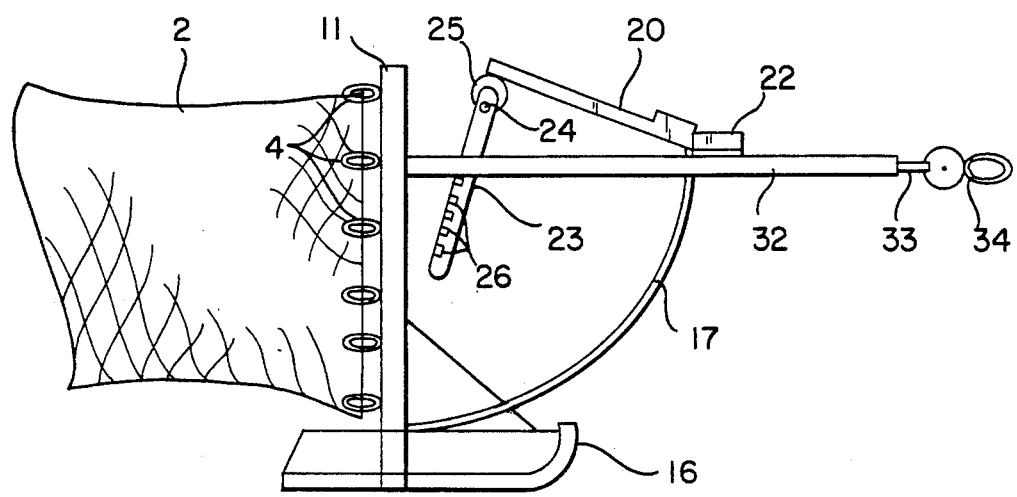
FIG. 2 is a detail of the front side of the invention showing the skid plate and dive plate features.

Referring now to FIGS. 1 and 2, the scallop drag 1 consists of a nylon net bag 2 and a frame assembly 3. The bag 2 is funnel shaped from the frame in the front to the main holding bag in the rear. This funnel shape helps reduce drag on the device as it is pulled along the bottom. The nylon net bag 2 is attached to the frame assembly by a series of small shackles in the preferred embodiment, or a series of rings or chain links 4 as shown.

A splitting strap 5 is connected to the net 2 at the approximate mid point of the net 2. The splitting strap 5 has a snap link 6 that is used to attach the splitting strap 5 to the frame assembly 3 at link 7. Note that the splitting strap 5 and the link 7 can be placed on either side of the frame for convenience. Use of the splitting strap 5 will be discussed in detail below.

The frame assembly 3 consists of a rectangular opening formed by frame members 10, 11, 12, and 13. The frame is made of steel or other suitable material. In the preferred embodiment, the lower frame member 13 is drilled with holes 14 to accommodate tines 15. The tines are made of steel rods, reinforcing bar, or similar materials. The tines 15 can be adjusted and spaced in any configuration desired depending on the type of shellfish desired. Thus, the tines 15 would be set farther apart for scallops than they would be for oysters. The tines 15 can be spaced to ensure immature shellfish and rocks are avoided. The tines 15 are adjusted by removing them from the particular holes 14 that they currently occupy and moving them to alternate holes 14. The number of tines may be added or substrated as needed. The tines 15 can also be welded in place or otherwise fastened to the frame as desired.

The device will simply be pulled over a large rock, causing no difficulties with the net. Furthermore, in the preferred embodiment, the opening of the frame between the top of the frame and the tines is only approximately 6 inches. This small spacing prevents many large rocks from being caught in the net.

Figure 3:
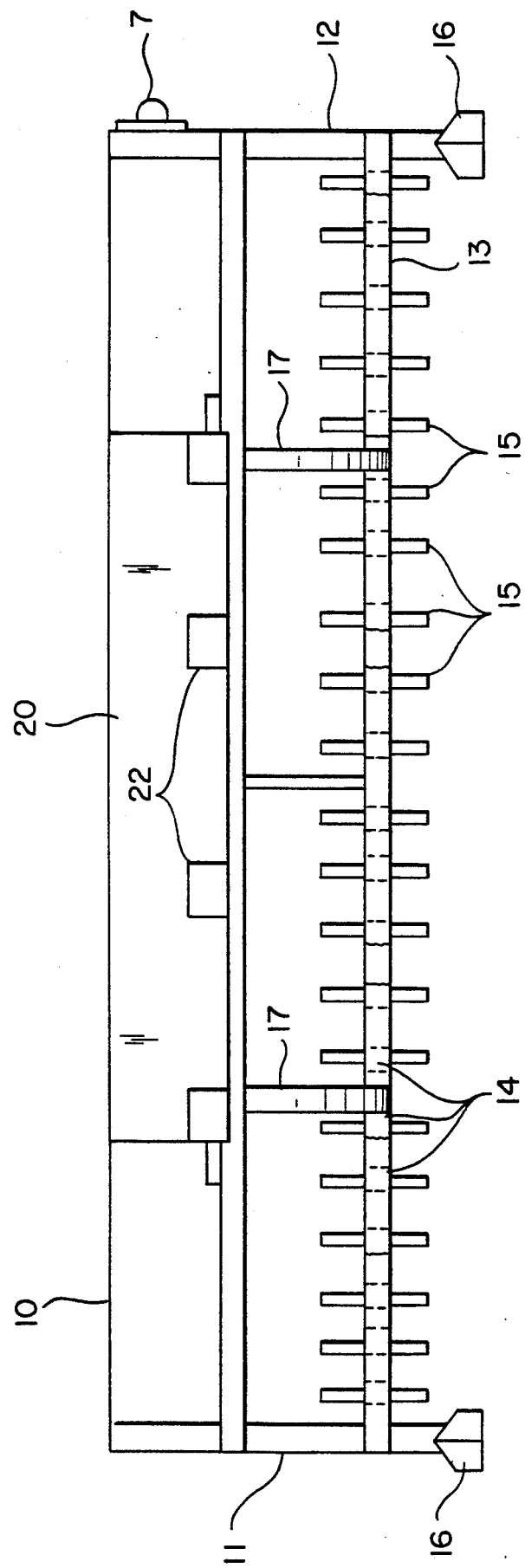
FIG. 3 is a front view of the invention.

To assist the frame in moving along the bottom, a pair of skids 16 are attached to the frame members as shown. The skids 16 are welded to the frame at members 10 and 13 as shown. The skids slide over the bottom and prevent the frame from digging into the sand on the bottom. In addition to the skids, two leaf springs 17 are attached between the bottom of the frame 13 and the yoke 30 (see FIGS 2 and 3). The springs 17 ensure that the device will travel safely over rocky bottoms, while still maintaining adequate contact with the bottom. The springs 17 also protect the frame from excessive bending force by adding flexibility to the frame.

A diving plate 20 is attached to the frame on extensions 21. The extensions 21 help brace the pulling yoke (discussed below). The diving plate 20 is attached to the extensions 21 with hinges 22. The hinges 22 allow the diving plate 21 to be adjusted up or down, changing its angle (see FIG. 2) as needed for the conditions. The angle of the diving plate 20 is adjusted and locked in place by lifting bar 23. The lifting bar 23 is attached to the diving plate 20 using pins and rings or other means common to the art. FIG. 2 shows a pin 24 and a ring 25. The other end of the lifting bar 23 has a number of holes 26. A second pin 24 is put through the selected hole 26 in lifting bar 23 when the desired angle for the diving plate 20 is reached.

The diving plate 20 is used to keep the frame of the device firmly on the bottom. As the angle is adjusted upward, a powerful downward force is placed on the diving plate 20 as the device is pulled through the water. This force permits the device to operate properly on the bottom, yet, not have the heavy metal frames or steel rings bags commonly used to weight down other scallop drags.

The device is pulled by a yoke 30. The yoke 30 has two frame members 31 and 32 that are connected to the frame as shown (see FIG. 1). The frame members 31 and 32 are angled as shown and are joined and attached at brackt 33. Bracket 33 is fitted with a eye that secures a shackle 34. A cable 40 (see FIG. 5) is connected to the shackle 34 and is used to pull the drag through the water.

Figure 4:
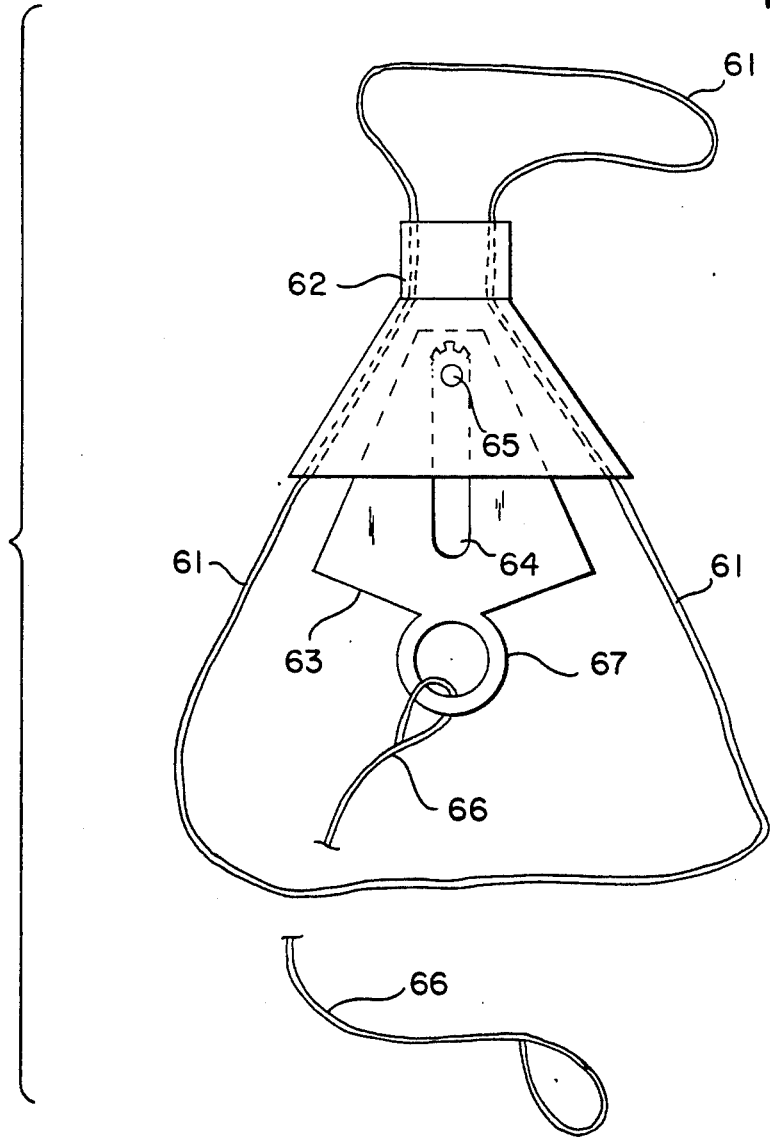
FIG. 4 is a detail of a commercially available cod end release.

Referring now to FIGS. 1 and 4, a cod end 50 is attached to the bottom of the net. A cod end 50 is a mechanism that permits a net to be sealed off for use and when ready for dumping, a cod end release 60 is used to open the cod end 50, allowing the contents to be dumped safely onto a deck. When the net is empty, the cod end can be re-closed and set for another run. The cod end release 60 is a commercially available product. It operates as follows. The cod end 50 is fitted with a series of rings 51 (see FIG. 1) through which a rope 61 is fed, forming a loop. The ends of the rope 61 are then placed through the funnel 62 of the cod end release. A slidable plug 63 is placed within the funnel 62 as shown. The plug 63 has a slot 64, placed therein, which is used to hold the plug 63 in place yet enable it to slid partially out of the funnel 62. A bolt 65 is used to keep the plug 63 from being pulled completely from the funnel. A lanyard 66 is attached to the plug 63 through ring 67. The rope 61 can be readily pulled through the funnel 62 when the plug 63 is in the outmost position as shown. The spacing of the funnel 62 is such that the distance between the rope 61 and the plug 63 is minimal. That ensures a tight fit when the plug 63 is set. The ends of the rope are often knotted to prevent the rope 61 from being pulled through the funnel 62.

To set the release, the rope 61 is pulled through the funnel until the cod end 50 is pulled tight. The plug 63 is then pushed into the funnel 62, tight against the rope 61, and then secured with a blow from a mallet. To release the cod end, the cod end is placed above the deck and the lanyard 66 is held away from the cod end, at a safe distance. The lanyard 66 is then pulled, which releases the plug 63. When the plug 63 is released, the rope 61 is no longer restrained and will, under the weight of the catch, cause the cod end 50 to open, dumping the catch on the deck.

Although the preferred embodiment uses a cod end release which is commercially available, it is possible to substitute other types of release mechanisms. For example, one of the alternatives is the so called draggerman's knot. This knot is actually a series of loops that are intertwined. The loops hold secure until the end is pulled, whereupon the loops unravel and the knot releases the end of the bag.

In this manner, the drag can be brought to the surface, and the bag only brought aboard ship to be dumped, leaving the heaver metal parts of the drag, safely off the boat.

Figure 5:
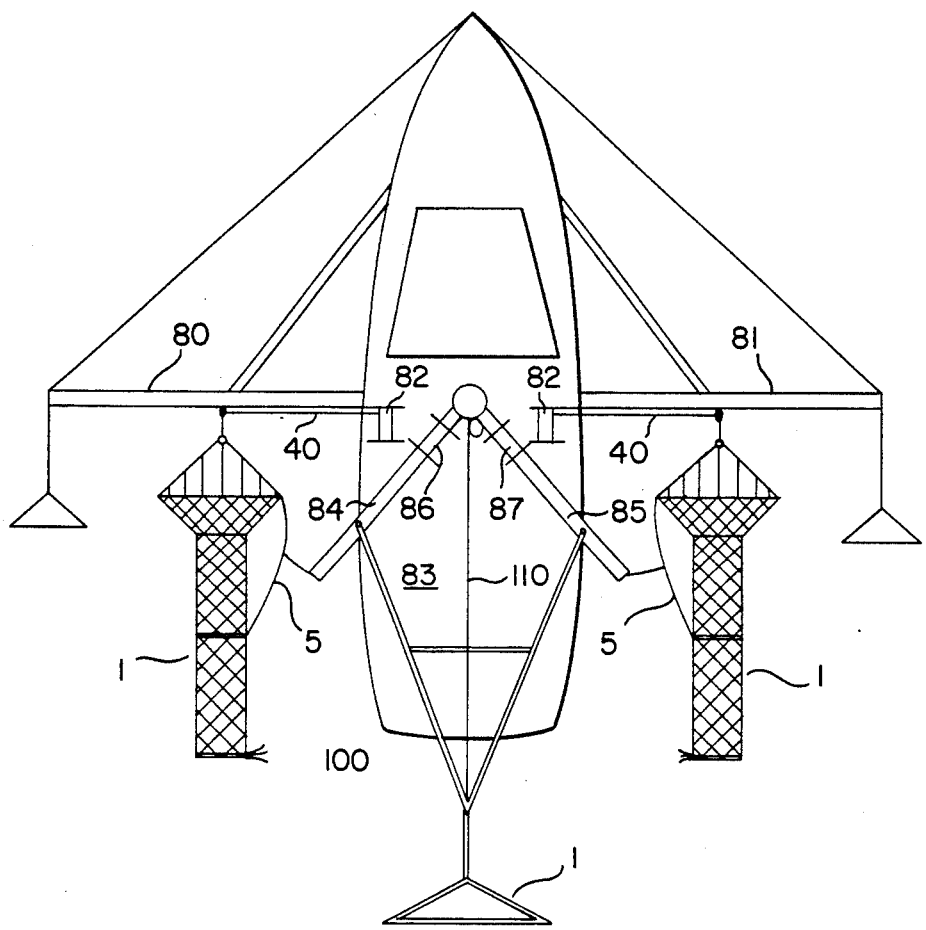
FIG. 5 is a representative view of the use of booms to support the drag either prior to use or prior to unloading.
Figure 6:
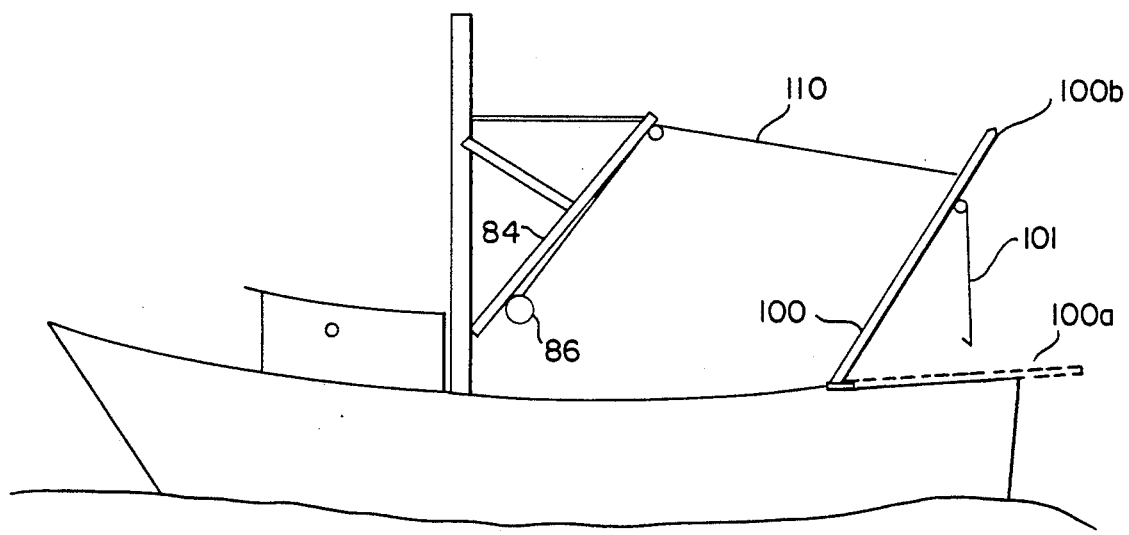
FIG. 6 is a representative view of the side of the boat, showing the boom placements.
Figure 7:
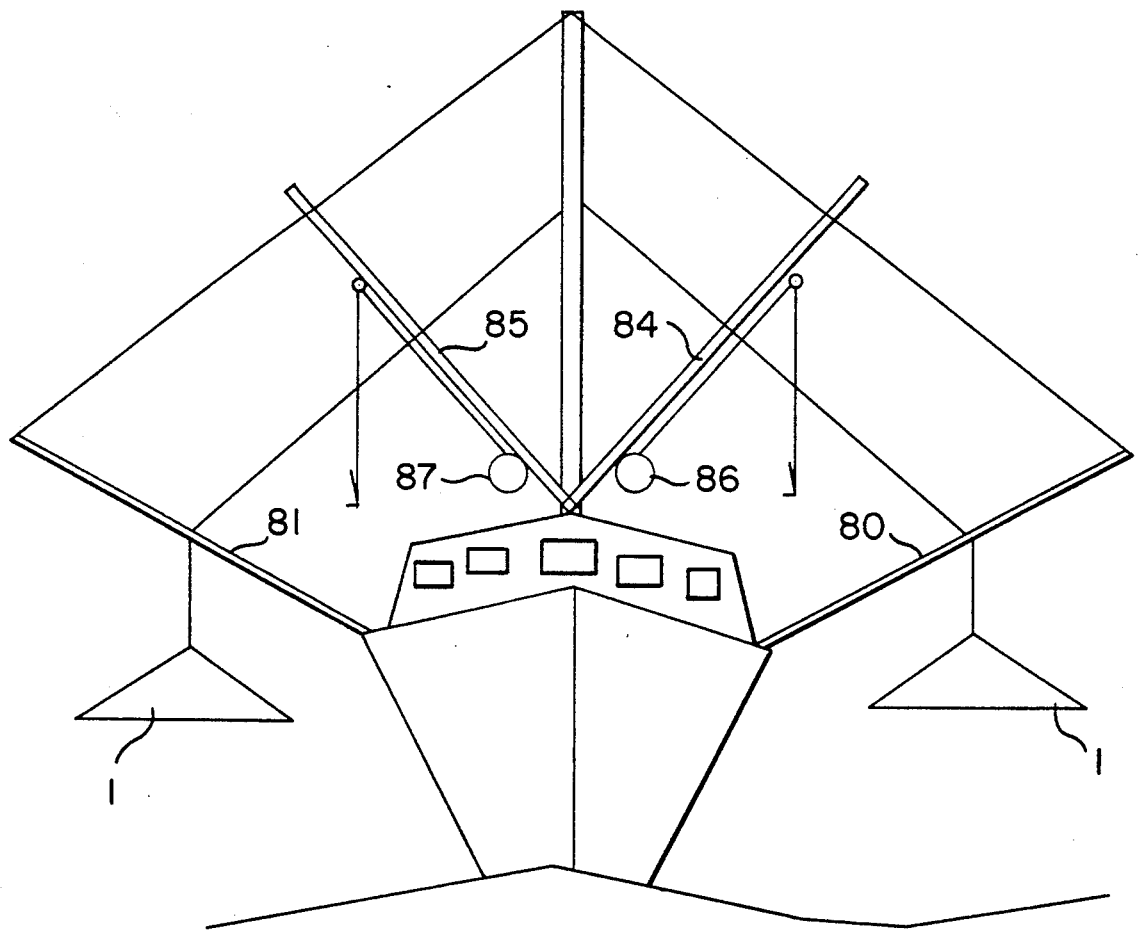
FIG. 7 is a representative view of the front of the boat, showing the invention secured prior to unloading.

Referring now to FIGS. 5, 6 and 7, a method of use will now be discussed. In practice, significant fuel savings are possible using this drag. It is also possible to use smaller boats when fishing, further saving fuel and operating funds. The preferred method of fishing with the drag is to have two drags suspended by poles 80 and 81 as shown (note that the figure shows rigging lines commonly used to support the poles and booms, but which are not discussed to prevent confusion). The cable 40 can be routed through blocks from winches 82 mounted on the deck 83. In the preferred method, two drags, one on each side of the boat, are dropped into the sea and allowed to sink to the bottom. The drags are then dragged along the bottom until the shellfish bed has been passed. Both drags are then retrieved with the winches to ensure an even pull on the boat. When the drags are fully up, the splitting straps 5 are hooked from booms 84 and 85. The splitting strap is pulled up by winches 86 and 87, that are mounted on the booms 84 and 85. As The splitting strap 5 is pulled, it purses the bag by tightening the rings 90 (see FIG. 1). The cod end of the bag (now loaded with scallops or other shellfish) is then pulled onto the deck of the boat, and the release is then pulled and the catch is released. When the bag is empty, the cod end is reset. The second drag is emptied and reset in the same manner. The drags are then dropped once more if additional fishing is desired.

If the bag is filled full, a two step unloading process is used. The pulling strap is used to purse the bag into two portions as before, but now, the upper portions of the bag is full. Once the lower portion is unloaded, the cod end can be reset, the splitting strap released, and the remainder of the catch is allowed to fall into the lower portion of the bag. The bag is then brought aboard and unloaded as before.

Where one bag is used, a different arrangement is used. Referring to FIGS. 5 and 6, an A-frame member 100 is attached to the stern. When the bag is deployed, the A-frame 100 is lowered into position 100a. When the bag is retrived, the A-frame 100 is raised to position 100b by a line 110, which is run through a block 109 to a winch 86. In this position, the bag is held overboard. A separate line 101 is ran over a block 102 and is fitted with a hook 103. The hook is used to grab the splitting strap, which is then used to winch (using e.g., winch 82) the loaded bag aboard for unloading. Once unloaded and reset, the bag can be dropped overboard and the A-frame is dropped back into the deployment position.

In this manner, significant quantities of shellfish can be harvested from small boats. The use of smaller boats and shorter catch times produces substantial fuel savings, as discussed above, over larger boats.

The present disclosures should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An apparatus for collecting shellfish and the like comprising:
    (a) a rectangular frame having a length greater than its width and being open in the center of the frame;
    (b) a lightweight net having a first end and a second end and a center, said first end being attached to said frame and extending outwardly therefrom and perpendicularly thereto such that said frame creates a structure to hold the net open to allow shellfish to be collected therein, said second end being fitted with a release means;
    (c) tine means removably connected to said frame and extending downwardly therefrom;
    (d) adjustable weighting means, being constructed of lightweight material, attached to said frame to provide a large downward force on said frame when said frame is being dragged along a scallop bed, but provides no such force when the net is not being dragged;
    (e) yoke means, rotatably attached to said frame means to allow the apparatus to be pulled; and
    (f) pulling means to pull said apparatus along the sea bottom.

2. The apparatus of claim 1 wherein said release means comprises a line interlaced with rings placed around the second end such that when said line is pulled tight, the second end is closed, said line also having a cod end release mechanism placed thereon to hold the bag closed.

3. The apparatus of claim 1 wherein said release means comprise a line interlaced with rings placed around the second end such that when said line is pulled tight, the second end is closed, said line also having a draggerman's knot placed thereon to hold the bag closed.

4. The apparatus of claim 1 wherein said tine means are formed of reinforcing bars.

5. The apparatus of claim 1 wherein the adjustable weighting means comprises a dive plate, adjustably attached to the frame such that when the apparatus is being pulled, the dive place produces a large downward force on the frame, which tends to hold the frame on the bottom of the sea.

6. The apparatus of claim 1 further comprising spring means fixedly attached to said rectangular frame and said yoke means.

7. An apparatus for collecting shellfish and the like comprising:
    (a) a rectangular frame having a length greater than its width and being open in the center of the frame;
    (b) a lightweight net having a first end and a second end and a center, said first end being attached to said frame and extending outwardly therefrom and perpendicularly thereto such that frame creates a structure to hold the net open to allow shellfish to be collected therein, said second end being fitted with a release means
    (c) tine means removably connected to said frame and extending downwardly therefrom;
    (d) a plate means, adjustably attached to the frame such that when the apparatus is being pulled, the plate means produces a large downward force on the frame which tends to hold the frame on the bottom of the sea, but provides no such force when the net is not being pulled;
    (e) yoke means, rotatably attached to said frame means to allow the apparatus to be pullled; and
    (f) pulling means to pull said apparatus along the sea bottom.

8. The apparatus of claim 7 wherein said release means comprises a cod end release mechanism.

9. The apparatus of claim 7 wherein said release means comprise a line interlaced with rings placed around the second end such that when said line is pulled tight, the second end is closed, said line also having a draggerman's knot placed thereon to hold the bag closed.

10. The apparatus of claim 7 further comprising spring means fixedly attached to said rectangular frame and said yoke means.

11. A method of collecting shellfish from a shellfish bed in the sea comprising the steps of:
(a) suspending a shellfish collection net from suspension means extending radially outward from a fishing vessel, said collection net having a metal frame at one end, a net having a bottom bag portion and a cod end attached to said bottom portion and a splitting strap attached to one end to said frame and at another end to said net to allow the bag portion of the net to be brought aboard said fishing vessel;
(b) dropping said net into the sea at the location of said shellfish bed;
(c) dragging the net across said shellfish bed so as to collect shellfish;
(d) retrieving the net containing shellfish until the net is again suspended from said suspension means;
(e) attaching a hook and line to the splitting stap from booms on said fishing vessel pulling said strap onto said fishing vessel thereby bringing only said bag portion of the net onto the deck of said fishing vessel;
(f) releasing said cod end on said net, thereby relesing the shellfish collected in of the net onto said deck of said vessel;
(g) re-securing the cod end;
(h) placing said bag portion of said net overboard.

12. The method of claim 11 wherein said support means comprise two booms, extending laterally from opposite sides of the vessel and a collection net is suspended from each boom.

13. The method of claim 11 wherein said suspension means comprises an A-frame support member that extends from the stern of the fishing vessel.

* * * * *